(No Model.)
J. F. DONAHOE.
RADIATOR.
No. 510,244.
2 Sheets—Sheet 1.
Patented Dec. 5, 1893.
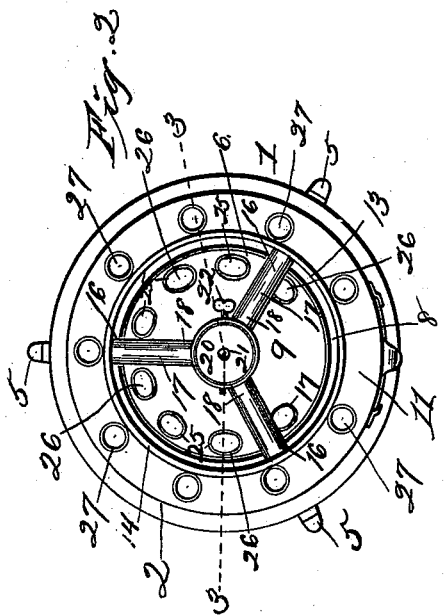
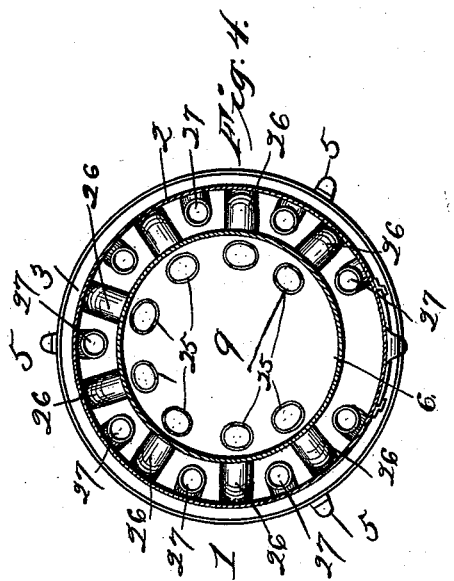
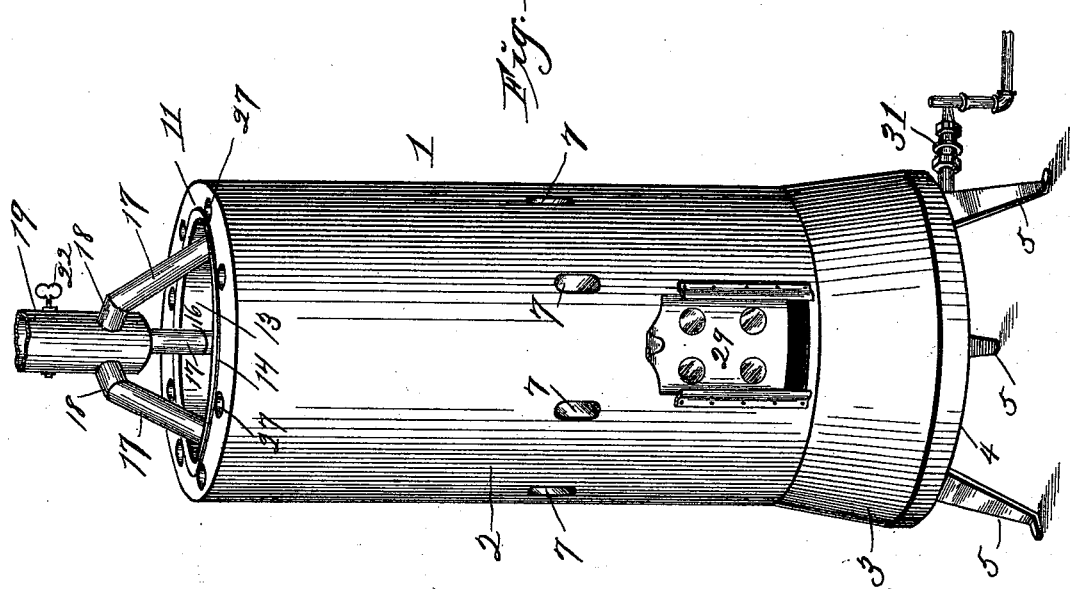
Witnesses.
M. P. Smith.
G. J. Thorpe.
Inventor:
John F. Donahoe.
By Higdon & Higdon
attys.

(No Model.) 2 Sheets—Sheet 2.
J. F. DONAHOE.
RADIATOR.
No. 510,244. Patented Dec. 5, 1893.
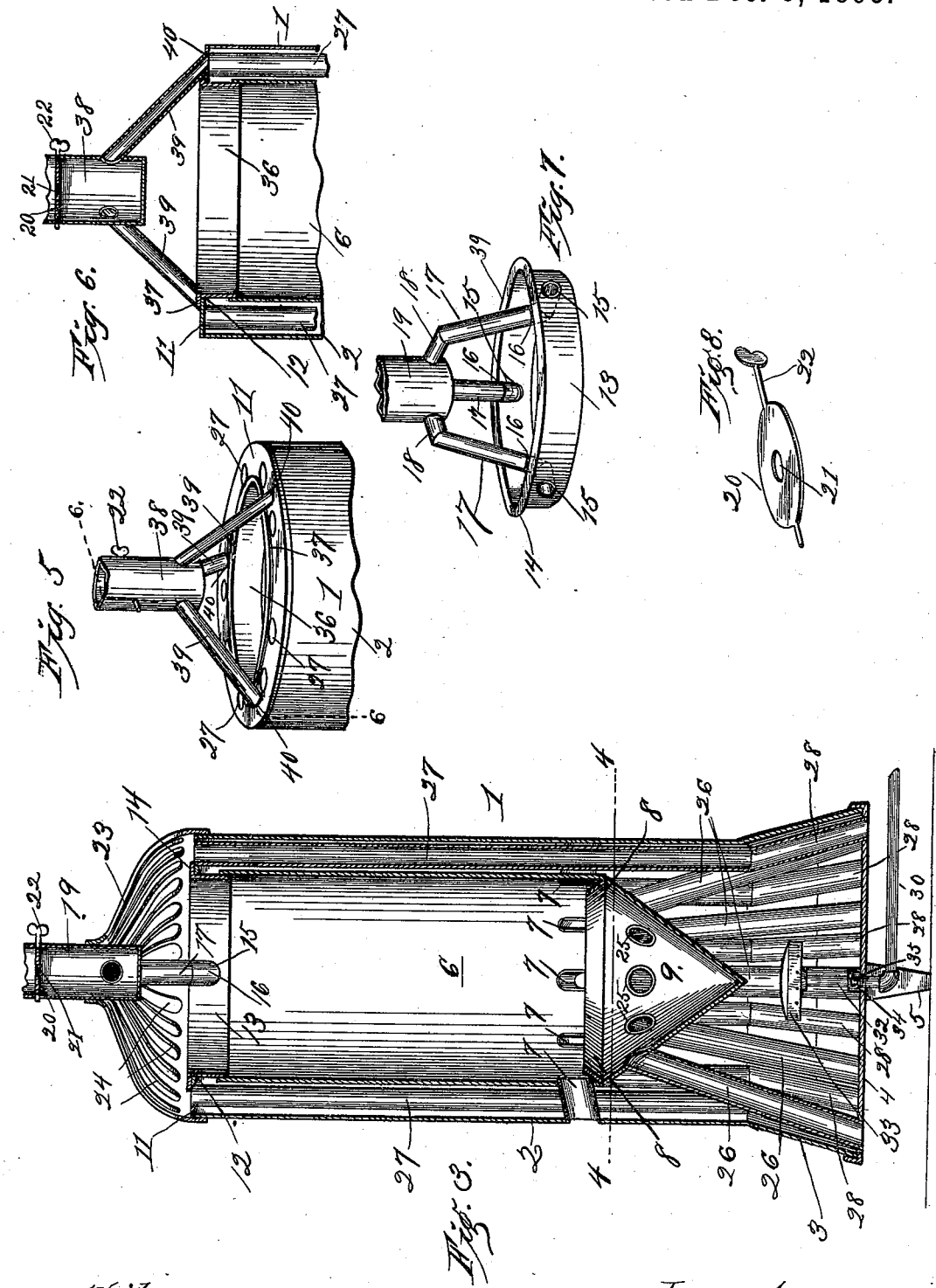
Witnesses:
M. Smith.
G. H. Thorpe.
Inventor:
John F. Donahoe.
By Higdon & Higdon
Att'ys

UNITED STATES PATENT OFFICE.

JOHN F. DONAHOE, OF PAOLA, KANSAS.

RADIATOR.

SPECIFICATION forming part of Letters Patent No. 510,244, dated December 5, 1893.

Application filed February 3, 1893. Serial No. 460,821. (No model.)

*To all whom it may concern:*

Be it known that I, JOHN F. DONAHOE, of Paola, Miami county, Kansas, have invented certain new and useful Improvements in Radiators, of which the following is a full, clear, and exact description, reference being had to the accompanying drawings, forming a part hereof.

My invention relates to improvements in radiators, to be applied especially to gas burners, but which may also be used in connection with oil or vapor burners if desired; and the objects of my invention are to produce a radiator which shall possess the maximum of air heating space, which air is heated by the escaping products of combustion; and also to produce a radiator which shall convey said products of combustion from the room, without contact with the external air; and furthermore to produce a radiator of simple, durable and inexpensive construction.

Figure 1, represents a perspective view of a radiator embodying my invention. Fig. 2, is a top-plan view of the same. Fig. 3, is a vertical section of the radiator, taken on the line 3—3 of Fig. 2. Fig. 4, is a horizontal section, taken on the line 4—4 of Fig. 3. Fig. 5, is a perspective view of the upper end of the radiator, and provided with a modified form of removable top. Fig. 6, is a vertical section, taken on the line 6—6 of Fig. 5. Fig. 7, is a detached perspective view of the ring and a portion of the removable top. Fig. 8, is a detail perspective view of the damper.

In the drawings, 1 represents the radiator, which is shown of cylindrical form, but which may be of any other suitable form without departing from the essential spirit of the invention. This radiator consists of the outer shell or casing 2, preferably enlarged at its lower end as shown at 3, but which may be of the same diameter throughout if desired. This outer shell or casing is provided with a bottom 4, and with a number of supporting legs 5 which rest upon the floor. Arranged concentrically within and of lesser diameter than the outer shell or casing 2 is the inner cylindrical casing 6, which extends from within a short distance of the upper end of the outer shell or casing to within a suitable distance of the bottom thereof, and provided near its lower end with a series of openings, from which extend radially and outwardly the air heating pipes 7, the outer ends of which communicate with openings in the outer casing or shell 2. The inner casing 6, is formed at its lower end with a depending and inverted cone-shaped bottom 9, the lower end or apex thereof projecting downward into the body of the outer shell or casing a suitable distance.

The upper end of the outer shell or casing 2, has secured thereon the outer margin of a top-plate 11, which is provided with an enlarged central opening 12, the diameter of which corresponds to the internal diameter of the inner cylinder or casing 6. The upper end of the radiator is provided with a removable section which is constructed as follows:

13 designates a ring which is of diameter to fit within said opening 12 of the top-plate 11 and is provided with a horizontal flange 14 extending outwardly from its upper end, which rests upon the top-plate 11, and the vertical portion of said ring extends downward and fits within the upper end of the inner cylinder or casing 6. This ring is provided in its vertical portion with a number of openings 15, which communicate with the upper end of the space between the outer and inner casings. Elbow pipes 16 are fitted at their lower ends in said opening, and are connected by the upwardly converging pipes 17 and the elbows 18 with an inverted cap 19, the upper end of which is adapted to engage with a flue-pipe of the ordinary construction and arrangement. This inverted cap 19 is provided with a damper plate 20 having a small opening 21 therethrough, the object of which will be hereinafter explained, and with a handle 22, by which to operate said damper. This upper removable section is covered by a suitable cast metal dome or cap 23, which is provided at its top with an opening through which the pipe 19 passes, and is also provided with radial openings 24 for the escape of heated air; the said openings extending from near the top of the dome or cap nearly to its lower margin to afford free exit for the heated air, which margin fits over the upper end of the outer shell or casing 2.

The cone-shaped bottom 9 of the inner casing 6, is provided just below the junction of the inner casing with the upper margin of said conical end 9, with a series of openings 25 into which fit the upper ends of air heating pipes 26, which are arranged to diverge outwardly and downwardly and their lower ends are fitted into openings in the bottom 4 of the radiator. A dividing ring 8, of frusto-conical shape in cross-section, and of diameter suitable is fitted within the inner casing, and is interposed between the openings 25 of the cone-shaped bottom thereof, and the inner ends of the air conducting pipes 7, the object of said ring being to divide the air-currents entering the inner casing, so that a free or uninterrupted circulation may be attained. The tendency of the up-current from the openings 25 without the use of the dividing ring 8, being to prevent the free entrance of the air through pipes 7, to the interior of the casing, while with the dividing ring in position the up-current from through openings 25 has a tendency to draw the outside air through the pipes 7 and the inner casing 6. The top plate 11 is also provided with a series of openings into which are fitted the upper ends of the vertical air heating pipes 27, the lower ends of which communicate with openings in the bottom 4 of the radiator; these pipes 27 being arranged to extend down between the air heating pipes 7, and to alternate with the air-heating pipes 26 as shown in Figs. 3 and 4. The lower ends of the pipes 27 diverge outwardly preferably, as shown at 28, to economize space, so that a large burner may be used if desired, but they may continue vertically throughout the radiator if desired.

The outer shell or casing 2 of the radiator is provided near its lower end with a door 29, to give access to the interior of the lower portion of the radiator when necessary or desirable. The pipe 30 is provided with a valve 31 of any suitable construction, and is connected to the gas supply (not shown) and is also coupled to the lower end of the vertical pipe 32, which, extending upward through the bottom of the stove, carries the burner 33 at its upper end, which burner is located in close proximity to the apex of the conical deflector 9. An adjustable collar 34 is secured by a set-screw 35 around the pipe 32 and is adapted to support the burner cap and pipe within the radiator.

In Figs. 5 and 6, a modified form of the upper portion of the radiator is shown; the removable section referred to being dispensed with. I provide a ring, the vertical portion 36 of which is adapted to fit within the upper end of the inner casing, and the opening 12 of the top-plate 11, and is provided with a horizontal flange 37 resting upon the said top-plate 11. In the modified forms, represented by Figs. 5 and 6, this ring may be rigidly and permanently secured to the top-plate if desired, or the inner casing may be extended upward to the said top-plate if desired. An inverted cap 38 (similar to the cap 19) is provided with openings, and smoke tubes or pipes 39 are fitted at their upper ends in said openings, and at their lower ends in openings 40 in the top-plate 11, and communicate with the space between the inner and outer casings. The inverted cap 38, is also provided with a damper, similar to the damper previously described. A skeleton dome or cap similar to the one described, is also used upon the radiator top, shown in Figs. 5 and 6.

From the above description, it will be seen that the heat and products of combustion first impinge upon the lower surface of the cone-shaped bottom 9 of the inner casing, and the air heating pipes 26, and are directed thereby into the space between the inner and outer casings and envelop the vertical pipes 27, and the pipes 7. From the upper end of this space, the heat and products of combustion pass through the pipes 16, 17, 18 or 39 into the inverted caps 19 or 38, and should the damper be closed, the heat is retained or concentrated therein for a time, because of the smallness of the opening 21 in the damper. The cold air entering the lower end of the pipes 26, 27 and the pipes 7, is thoroughly heated, and passes from the upper end of the inner casing, and the upper end of the pipes 27, and radiates throughout the room; thus a constant circulation is kept up, and heated air continuously discharged from the upper end of the radiator into the room.

From the above description it will be seen, that I have produced a radiator, which is simple, durable and inexpensive of construction, and from which may be obtained the maximum of heat with a minimum expenditure of fuel, and which avoids all commingling of the heated air with the gases or other products of combustion.

Having thus described my invention, what I claim as new, and desire to secure by Letters Patent, is—

1. A radiator, comprising an outer vertical casing and an inner vertical casing extending to within a suitable distance of the upper end of the outer casing, a top-plate at the upper end of the outer casing having a central opening therethrough, a removable top, comprising a ring, consisting of a vertical portion having openings, and adapted to fit within the upper end of the inner casing and the opening of the top-plate, and a horizontal flange adapted to rest upon the top-plate, an inverted cap adapted to fit upon the stove-pipe, and outlet pipes communicating at their opposite ends with the interior of the cap, and with the openings in the vertical portion of the ring, and a damper having a small opening therein, located in said inverted cap, and above the upper ends of the outlet pipes, substantially as set forth.

2. A radiator, comprising an outer casing having a closed bottom and supported upon legs, an inner casing of less length than the outer casing, and having a cone-shaped bottom provided with openings, a top-plate at the upper end of the radiator and vertical air heating pipes interposed between the outer and inner casings and extending through the top-plate and the bottom of the radiator, air conducting pipes interposed between said vertical pipes and extending through the outer casing and the lower end of the inner casing; air heating pipes extending through the openings of said cone-shaped bottom of the inner casing, and through the bottom of the radiator and interposed between the vertical pipes at their lower ends, and a dividing ring located within the inner casing and interposed between the openings 25 of the cone-shaped bottom of the inner casing and the air conducting pipes 7, and a door in the outer casing, and a burner cap supported beneath the deflector, and a removable top for the radiator, comprising a ring having a horizontal flange resting upon the top-plate and a vertical portion depending through the top-plate and fitting into the upper end of the inner casing, and an inverted cap, and outlet pipes communicating at their opposite ends with the interior of the inverted cap and through the ring with the space between the outer and inner casing, substantially as set forth.

3. A radiator, comprising an outer casing and an inner casing extending to within a short distance of the upper end of the outer casing, a top-plate at the upper end of the outer casing, having a central opening, a ring adapted to close the space between the top-plate and the upper end of the inner casing, an inverted cap adapted to engage the flue pipe and having a damper therein, and outlet pipes communicating at their opposite ends with the said inverted cap and with the space between the outer and inner casings, substantially as set forth.

In testimony whereof I affix my signature in the presence of two witnesses.

JOHN F. DONAHOE.

Witnesses:
  W. T. JOHNSTON,
  T. E. SMITH.